United States Patent [19]
Gautier et al.

[11] Patent Number: 5,974,944
[45] Date of Patent: Nov. 2, 1999

[54] PNEUMATIC SERVO WITH SYMMETRIC CASING

[75] Inventors: Jean Pierre Gautier; Ulysse Verbo, both of Aulnay-Sous-Bois; Salvatore Spinello, Drancy, all of France

[73] Assignee: Bosch Systemes de Freinage, Drancy, France

[21] Appl. No.: 08/392,896

[22] PCT Filed: Feb. 16, 1995

[86] PCT No.: PCT/FR95/00186

§ 371 Date: Mar. 1, 1996

§ 102(e) Date: Mar. 1, 1996

[87] PCT Pub. No.: WO95/23718

PCT Pub. Date: Sep. 8, 1995

[30] Foreign Application Priority Data

Mar. 4, 1994 [FR] France ................................. 94 02498

[51] Int. Cl.⁶ ..................................................... F15B 9/10
[52] U.S. Cl. ...................... 91/376 R; 92/169.1; 91/369.2
[58] Field of Search ............................ 92/169.1, 169.2, 92/169.3, 169.4, 98 R, 98 D; 91/369.1, 369.2, 369.3, 369.4, 376 R

[56] References Cited

U.S. PATENT DOCUMENTS 4,256,016  3/1981  Thomas ................................. 91/376 R
4,604,944  8/1986  Tsubouchi ............................... 92/98 D

*Primary Examiner*—Thomas E. Denion
*Attorney, Agent, or Firm*—Leo H. McCormick, Jr.; Warren Comstock

[57] ABSTRACT

A pneumatic servo for assisting with braking having a casing (10) with a cylinder (38) and a cover (40) with an axis of symmetry (X-X'). A wall structure (12) divides the interior of the casing into a front chamber (14) and a rear chamber (16). The movable wall structure (12) has a rear tubular part (22) which slides in a leaktight fashion in the cover (40) and retains a three-way valve (26) which is actuated by a control rod (30). The front chamber (14) is permanently connected to a source of vacuum while the rear chamber (16) is connected selectively to the front chamber (14) and a source of pressure through the three-way valve (26). The cylinder (38) and cover (40) being made from two identical half-shells (38,40).

19 Claims, 3 Drawing Sheets

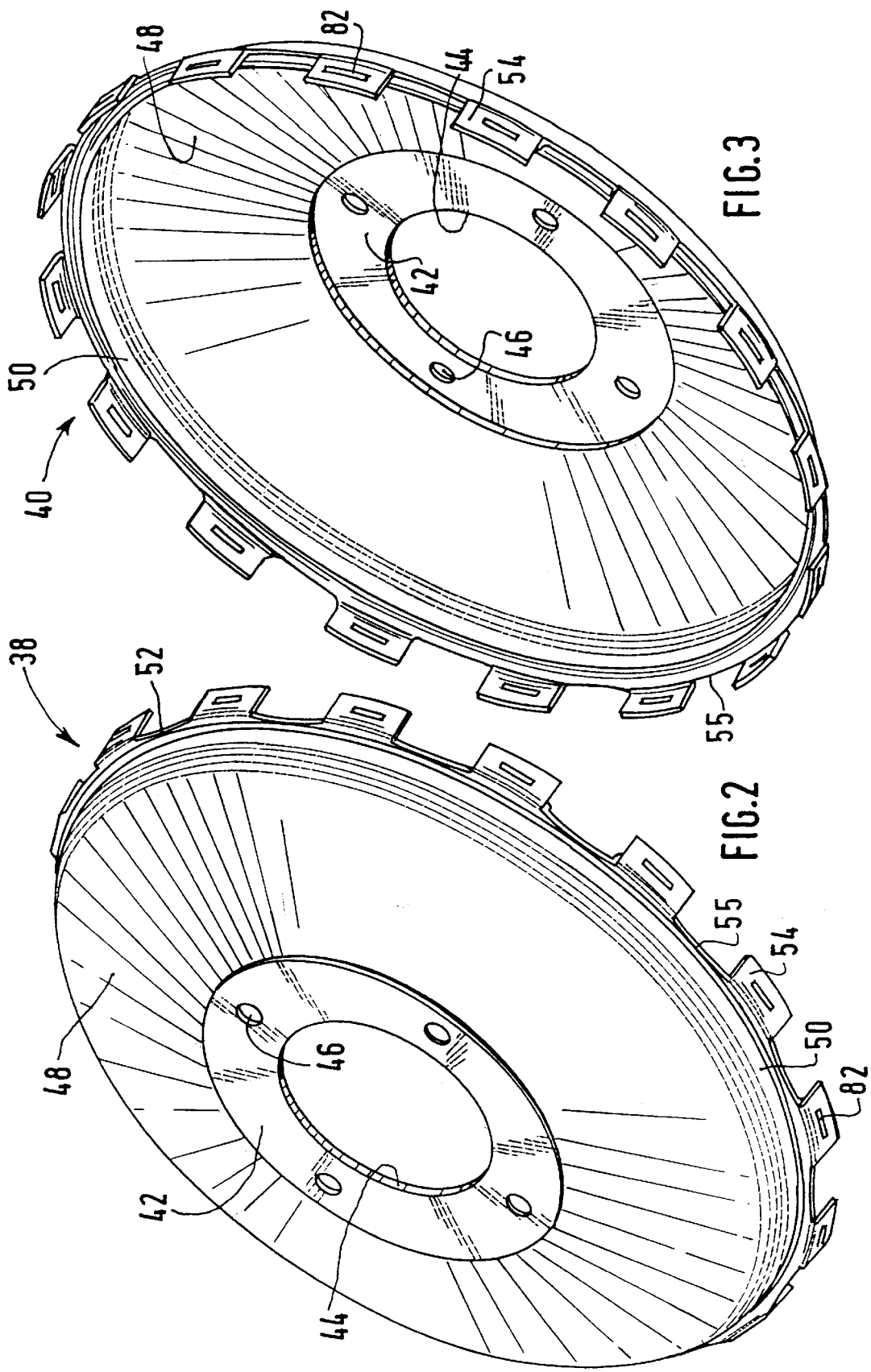

PNEUMATIC SERVO WITH SYMMETRIC CASING

The subject of the present invention is a pneumatic servo, of the type of those which are used to provide assistance with braking of motor vehicles.

BACKGROUND OF THE INVENTION

Such servos conventionally include a casing including a cylinder and a cover having an axis of symmetry, the inside of the casing being divided in leaktight fashion by a movable wall structure into a front chamber permanently connected to a source of partial vacuum, and a rear chamber connected selectively to the front chamber or to a source of pressure by a three-way valve located in a rear tubular part of the movable wall structure sliding in a leaktight fashion in the cover and actuated by a control rod.

Very many documents relate to this type of pneumatic servo. In all these known embodiments, the casing of the servo is typically formed of a front half-shell, also termed cylinder, and of a rear half-shell, also termed cover, the cylinder and cover being secured to one another by crimping, trapping between them an outer peripheral bead of the unrolling diaphragm providing sealing between the front and rear chambers.

The cover is conventionally intended to be fixed to the bulkhead of the vehicle, on the engine compartment side, and includes an axial cylindrical extension, also termed shaft, pointing toward the rear and penetrating into the passenger compartment of the vehicle. This shaft receives, with leaktight sliding, the rear tubular part of the movable wall structure containing the three-way valve.

The cylinder for its part includes a plane face around the axis of symmetry of the servo, which face is intended to receive a fastening flange of a master cylinder, actuated by a pushrod secured to the movable wall structure of the servo, when the latter is actuated.

It follows that the cylinder and the cover, together constituting the casing of the servo, form two different components. This implies that the time of design, manufacture, storage and management costs are multiplied by two. In particular, the cover including the shaft described above constitutes a component which is quite tricky and expensive to manufacture owing to its complex shape, rejects on the production or assembly line not being negligible.

SUMMARY OF THE INVENTION

The object of the present invention is therefore to solve this problem by proposing a servo for which the costs of manufacturing the casing are reduced to a large extent.

To this end, the invention proposes a servo of the type recalled hereinabove, in which the cylinder and the cover of the servo are made of two identical half-shells.

DETAILED DESCRIPTION OF THE INVENTION

Other objects, characteristics and advantages of the present invention will emerge clearly from the description which will follow of an embodiment given by way of non-limiting example, with reference to the appended drawings in which:

FIGS. 2 and 3 represent perspective views of the half-shells forming the casing of the servo of FIG. 1;

Figure 1:
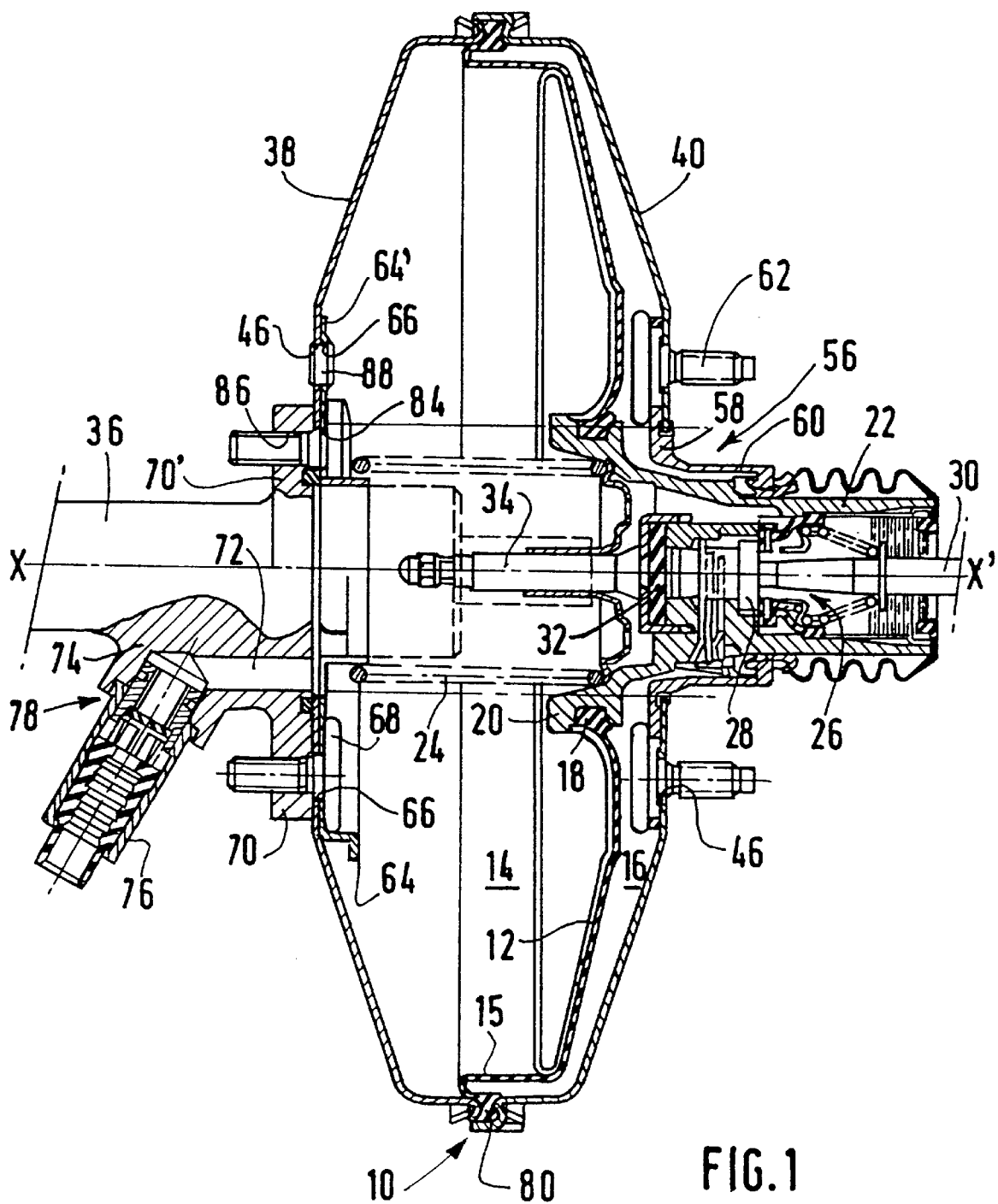
FIG. 1 represents a side view in transverse section of a pneumatic servo for assisting with braking produced according to the present invention.

FIG. 1 represents, in section, a pneumatic servo for assisting with braking, designed to be placed in the usual way between the brake pedal of a vehicle and the master cylinder controlling the braking circuit of this vehicle. By convention, that part of the servo which points toward the master cylinder is termed the "front", and that part of the servo which points toward the brake pedal is termed the "rear". In FIG. 1, the front is thus to the left and the rear to the right.

The servo represented comprises an outer casing 10 in the form of a shell, exhibiting a symmetry of revolution about an axis X-X'. The internal structure of the servo, and likewise its operation, do not form part of the present invention and will be recalled here solely by way of reminder.

A movable wall structure 12 delimits a front chamber 14 and a rear chamber 16 inside the casing. The movable wall 12 is associated with a flexible unrolling diaphragm 15, for example made of elastomer, the internal peripheral edge of which is received in a leaktight fashion by virtue of a bead 18 in a hollow boost piston 20 located along the axis X-X'.

The hollow piston 20 extends to the rear in the form of a tubular part 22 which passes in leaktight fashion through the rear wall of the casing 10. A compression spring 24 interposed between the piston 20 and the front wall of the casing 10 normally holds the piston 20 in the rear rest position illustrated in FIG. 1, in which position the rear chamber 16 has its minimum volume and the front chamber 14 has its maximum volume.

In the rear tubular part 22 of the piston 20 is housed a three-way valve 26, selectively placing the rear chamber 16 in communication with the front chamber 14, permanently connected to a source of partial vacuum, or with a source of pressure, constituted in the example represented by the atmosphere outside the servo. The operation of the three-way valve 26 is controlled by a plunger 28 secured to a control rod 30, of which the rear end (not represented), which projects out of the tubular part 22, is controlled directly by the brake pedal (not represented) of the vehicle.

When the control rod 30 is in the rear rest position, the valve 26 normally establishes a communication between the two chambers 14 and 16 of the servo. When the driver of the vehicle actuates the brake pedal, this results in a forward movement of the control rod 30 and of the plunger 28, which therefore actuates the valve 26.

In a first instance, the valve 26 isolates the chambers 14 and 16 from one another and then, in a second instance, establishes the communication between the rear chamber 16 and the atmosphere present around the control rod 30.

Air at atmospheric pressure is thus let into the rear chamber 14, creating a pressure differential on the two faces of the movable wall 12, and consequently generating a high degree of boost on the piston 20, adding to the input force applied to the control rod 30, and transmitted by means of a reaction disc 32 to a pushrod 34 actuating a piston (not represented) of the master cylinder 36.

In accordance with the present invention, the casing 10 is formed of two identical half-shells 38 and 40 represented in FIGS. 2 and 3 in perspective, viewed from the outside and the inside. The half-shell 38 is for example located at the front of the servo and replaces the traditional cylinder, and the half-shell 40 is located at the rear of the servo and replaces the traditional cover. What is more, the upper and lower halves of FIG. 1 illustrate two embodiment variants.

FIGS. 2 and 3 show that each half-shell 38 or 40 includes a plane central part 42 perpendicular to the axis X-X' when the servo is assembled, pierced with a central opening 44 and with openings 46 evenly distributed around the central opening 44.

Each half-shell also includes an intermediate part 48 of frustoconical overall shape, connected to a substantially cylindrical peripheral part 50. The peripheral part 50 is formed with a series of identical axial tongues 54 so as to exhibit a crenellated edge. The peripheral part 50 is additionally formed with a radial shoulder 52 between its connection with the intermediate part 48 and the bottom of the crenellations between the tongues 54, that is to say the edge 55 adjacent to a tongue 54.

The tongues 54 are evenly distributed along the peripheral edge of the part 50, such that the circumferential difference between two consecutive tongues is slightly greater than the common width of each tongue. In other words, the circumferential length of the edge 55 is slightly greater than the circumferential length of the tongues 54. Advantageously, the tongues 54 can be given a slightly isosceles trapezium shape, the small base of this trapezium pointing outwards. The circumferential length of the tongues would then be measured along the large base of this trapezium.

What is more, the outside diameter of the radial shoulder 52, in its part situated between two tongues, is slightly less than the inside diameter of the axial tongues, or yet the outside radius of the edge 55, measured from the axis X-X', is slightly less than the inside radius of the axial tongues 54, so that the tongues 54 of one of the half-shells can overlap the edge 55 of the other half-shell, and interlace with the tongues 54 of the other half-shell.

The half-shell forming the rear part of the casing 10 of the servo, in this case 40, is assembled with a component 56, including an annular front part 58 received in leaktight fashion in the opening 44, and a tubular rear part 60 in which the tubular rear part 22 of the piston 20 slides. Screws 62 are located in the openings 46 in order to fix the servo to the bulkhead separating the engine compartment from the passenger compartment of the vehicle. The screws 62 will advantageously participate in the fixing of the annular part 58 of the component 56 to the half-shell 40.

The half-shell forming the front part of the casing of the servo, in this case 38, is assembled with an annular component 64 or 64' of dimensions corresponding to those of the plane central part 42 of the half-shell 38, according to the two variants illustrated in the upper and lower halves of FIG. 1.

In the lower half of FIG. 1, it can be seen that the annular component 64 is formed with a central opening of dimensions matched to those of the master cylinder 36 and with openings 66 evenly distributed around this central opening and corresponding in terms of number and in terms of geometric layout to the openings 46 of the half-shell 38, so that the openings 46 and 66 are axially aligned and allow fastening onto the half-shell 38 of the master cylinder 36 by means of screws 68 interacting with a mounting flange 70 of the master cylinder.

The master cylinder 36 is slightly modified by comparison with a conventional master cylinder, and includes a passage 72 passing through the flange 70 and emerging in a connector 74. The connector 74 is intended to receive an end fitting 76 for connection to a source of partial vacuum, such as the inlet manifold of a combustion engine or a vacuum pump, the end fitting 76 including a non-return valve 78.

According to the foregoing explanations, it will have been understood how the invention may be implemented. The rear part of the servo is first of all made up, by assembling, in leaktight fashion, a half-shell with the component 56, then by fixing the screws 62, for example by crimping, onto the half-shell and finally by placing the internal mechanism of the servo, that is to say the piston 20 with the movable wall 12, the pushrod 34, the three-wave valve assembly 26 and the control rod 30 inside this assembly.

In parallel, the front part of the servo is made up by assembling a half-shell with the annular component 64, then by fixing the screws 68, for example by crimping.

The front and rear parts of the servo may then be assembled with one another, by interposing the compression spring 24 and the outer peripheral bead 80 of the flexible diaphragm 15 between them. At the beginning of the assembly operation, the tongues 54 of one of the half-shells are interposed between the tongues 54 of the other half-shell, by virtue of the respective circumferential dimensions of the tongues and of the spaces between the tongues, and interlace by virtue of the respective diameters of the inside of the tongues and of the outside of the shoulder 52 between two tongues, as is represented in FIG. 4, the assembly movement being further facilitated if the tongues are given the trapezoidal shape described above.

Figure 4:
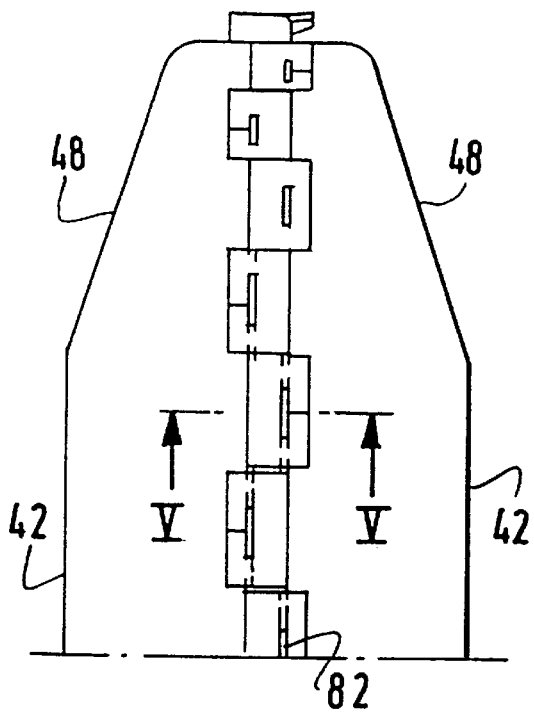
FIG. 4 represents a half side view of the servo of FIG. 1.
Figure 5:
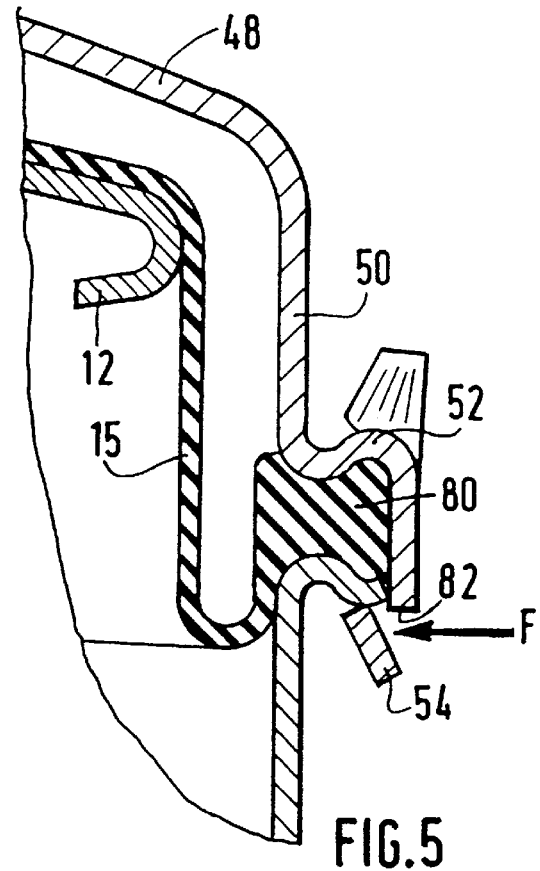
FIG. 5 represents an enlarged partial view of a longitudinal section of the servo along the line V—V of FIG. 4.

To complete the assembly operation, the two half-shells 38 and 40 are secured to one another, for example by crimping, as can best be seen in FIGS. 4 and 5. To this end, a precut 82 may be formed parallel to the free edge of each tongue. Such crimping may be carried out in the conventional fashion by pressing the two half-shells against each other then by applying to each tongue, with the aid of a punch (not represented), a force in the direction of the arrow F in FIG. 5 onto the part of tongue neighbouring the precut 82 on the free edge side of the tongue, so as to deform the outer part of each tongue of one of the half-shells lying between the precut and the free edge, this deformed part coming to rest on the shoulder 52 of the other half-shell.

After these operations, the servo is assembled and ready to use. The master cylinder 36 may thus be fixed to it by means of the screws 68, the master cylinder being modified as was seen above. The passage 72 made in the flange 70 emerges inside the opening 44 in the half-shell 38, the annular component 64 being of course constructed so as not to obstruct this passage.

The servo/master cylinder assembly may then be installed on the bulkhead of a vehicle, as a conventional servo, with the aid of the screws 62, and be rendered operational by connecting the end fitting 76 to a source of partial vacuum.

It is therefore seen that the invention makes it possible to produce a servo of reduced cost because its casing is essentially formed of two identical and easily producible half-shells and of the additional component 56, attached to the rear half-shell. Since this component 56 undergoes no stresses during operation, it may be produced from a lightweight material such as a thermoformed plastic. The invention thus also contributes to reducing the weight of the casing of the servo. What is more, the other internal components of the servo such as the movable wall and the three-way valve are not modified, so that they can be used in a casing produced in accordance with the invention. Only the master cylinder includes a slight modification, without significant implication either on its manufacturing cost or on its weight.

The upper half of FIG. 1 represents an embodiment variant, which makes it possible to use conventional master cylinders without any modification.

It can be seen from the upper half of FIG. 1 that the half-shells 38 and 40 are, there again, identical. They each include a central opening 44, of diameter slightly greater than that of the central openings in the half-shells of the embodiment which has just been described.

The front half-shell 38 is assembled with an annular component 64' formed with openings 66 which correspond in terms of number and in terms of geometric layout with the openings 46 of the half-shell 38, so that the openings 46 and 66 are axially aligned.

The annular component 64' is also formed with openings 84, the centre of which is closer to the axis X-X' than that of the openings 66, so that these openings 84 are entirely inside the perimeter delimited by the opening 44 of the half-shell 38 when the latter and the annular component 64' are assembled. The openings 84 correspond in terms of number and in terms of geometric layout to the openings 86 made in the mounting flange 70' of a conventional master cylinder.

For assembling the servo, the front part of the latter is made up by joining the half-shell 38 and the annular component 64' so that the openings 46 and 66 respectively are axially aligned. The two components are then secured to one another for example by means of leaktight rivets 88. As a variant, leaktight rivets 88 may be located only in some of the openings 46–66, and the others may be plugged with the aid of leaktight stoppers.

Figure 6:
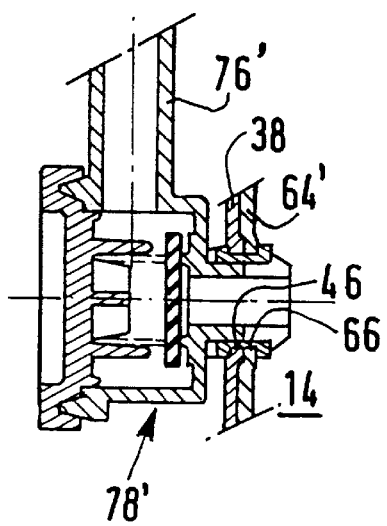
FIG. 6 represents a sectional view of a variant of the non-return valve equipping the servo of FIG. 1.

The remainder of the operations for assembling the casing of the servo are then entirely in accordance with the description which was given in relation to the preceding embodiment. An additional advantage of this embodiment, apart from the fact that conventional master cylinders are used, lies in the fact that one of the rivets 88 may be replaced by an end fitting 76' including a non-return valve 78', as represented in FIG. 6, thus avoiding having to make an additional opening in the half-shell 38.

Figure 7:
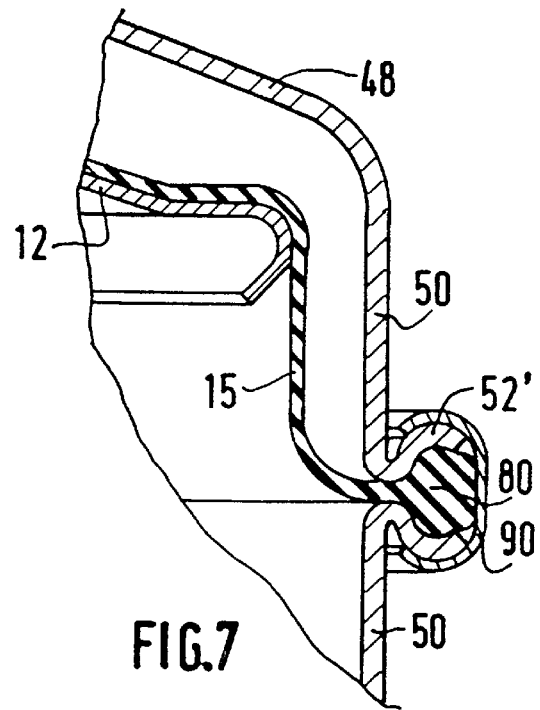
FIG. 7 represents a view similar to that of FIG. 5 of an embodiment variant of the half-shells forming the casing of the servo.

FIG. 7 represents a variant of the embodiment which has just been described, avoiding the operation of crimping for final assembly of the servo. It can be seen from this figure that the peripheral part 50 of each half-shell is formed with a continuous radial shoulder 52' which is curved so that its concavity points in the same direction as that of the half-shell.

During final assembly, the two half-shells are offered up against each other so that the peripheral bead 80 of the diaphragm 15 is housed between the concavities of the two shoulders 52'. The half-shells 38 and 40 may then be secured to one another by hooping 90 which clamps the shoulders 52'. The other operations of assembling the servo are identical to those which were described previously.

The present invention thus indeed makes it possible to produce a particularly economical servo, the casing for which requires only the manufacture of a single component which is simple to design and produce, and which at the same time facilitates management and storage of the components of the servo.

Of course, the invention is not limited to the embodiment which has just been described, but is capable, in contrast, of receiving numerous modifications which will be obvious to the person skilled in the art. Thus, the intermediate part 48 of each half-shell could be planar and in the same plane as the central part 42, and the number of tongues 54 formed on the end part of the peripheral part may be equal to any desired value, and, in particular, a single tongue could be designed extending over substantially 180 degrees about the axis X-X', or a smaller number of tongues could be envisaged, for example between two and four, each tongue then being crimped at several points onto the shoulder of the other half-shell, possibly with one precut per crimping point.

We claim:

1. A pneumatic servo for assisting with braking having a casing including a cylinder and a cover having an axis of symmetry, said casing being divided in leaktight fashion by a movable wall structure with a flexible unrolling diaphragm which divides the interior of said casing into a front chamber which is permanently connected to a source of partial vacuum and a rear chamber which is connected selectively to the front chamber and a source of pressure by a three-way valve; said three-way valve being located in a rear tubular part of said movable wall structure and actuated by a control rod, said tubular part sliding in leaktight fashion in the cover, characterized in that said cylinder and said cover of said casing are made up of identical first and second half-shells.

2. The servo according to claim 1, characterized in that each of said first and second half-shell includes a plane central part perpendicular to said axis of symmetry of said servo, an intermediate part and a substantially cylindrical peripheral part.

3. The servo according to claim 2, characterized in that said plane central part is formed with a central opening and with openings evenly distributed around said central opening.

4. The servo according to claim 3, characterized in that said peripheral part is formed with a crenellated edge including at least one axial tongue.

5. The servo according to claim 1, characterized in that said peripheral part is formed with a radial shoulder between said intermediate part and an edge adjacent to said tongue.

6. The servo according to claim 5, characterized in that said edge adjacent to said tongue has a circumferential length which is slightly greater than the circumferential length of said tongue.

7. The servo according to claim 6, characterized in that said tongue has a slightly isosceles trapezium shape with a small base which points outward.

8. The servo according to claim 6, characterized in that an outside radius of the edge on the peripherial part adjacent to said tongue is slightly less than an inside radius of said tongue.

9. The servo according to claim 8, characterized in that said two half-shells are secured to one another by deformation of an outer part of said tongue, said deformation causing a part of said first half-shell to rest on a shoulder of said second half-shell.

10. The servo according to claim 9, characterized in that at least one precut is formed in said tongue parallel to its free edge.

11. The servo according to claim 3, characterized in that said peripheral part is formed with a curved continuous radial shoulder, said continuous radial shoulder having a concavity of which points in the same direction as that of said corresponding first and second half-shells.

12. The servo according to claim 11, characterized in that an outer peripheral bead of the flexible unrolling diaphragm is housed between the concavities of said radial shoulders of each of said first and second half-shells.

13. The servo according to claim 12, characterized in that said first and second half-shells are secured to one another by hooping which clamps the two radial shoulders.

14. The servo according to claim 9 characterized in that said rear tubular part of said movable wall structure slides in leaktight fashion in a component received in a leaktight fashion in an opening of said second half-shell forming a rear part of said casing of said servo.

15. The servo according to claim 14, characterized in that said component received in leaktight fashion in the opening of said second half-shell forming the rear part of said casing of said servo is produced from a lightweight thermoformed plastic.

16. The servo according to claim 9, characterized in that said first half-shell forming the front part of said casing is assembled with a component including a central opening and openings which are evenly distributed around this central opening, said openings correspond in terms of number and geometric layout to said openings formed around the central opening of said first half-shell.

17. The servo according to claim 16, characterized in that said openings formed around the central openings in said first half-shell and in said component are axially aligned and allow a master cylinder to be fixed to said first half-shell by means of fixing screws interacting with a mounting flange of the master cylinder.

18. The servo according to claim 17, characterized in that said openings formed around the central openings in said first half-shell and in said component are axially aligned and are plugged by rivets or leaktight stoppers.

19. The servo according to claim 17, characterized in that said openings formed around the central openings in said second half-shell and in said component are axially aligned and receive an end fitting including a non-return valve.

* * * * *